United States Patent
Archie et al.

(10) Patent No.: US 11,693,683 B2
(45) Date of Patent: Jul. 4, 2023

(54) CONTAINER CERTIFICATE INJECTION

(71) Applicant: Pivotal Software, Inc., Palo Alto, CA (US)

(72) Inventors: Justin Tyler Archie, Denver, CO (US); Jeremy Scott Alvis, Boulder, CO (US); Jesse Thomas Alford, Boulder, CO (US); Kira Combs Boyle, Denver, CO (US); Austin Brown, Palo Alto, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 171 days.

(21) Appl. No.: 17/144,755

(22) Filed: Jan. 8, 2021

(65) Prior Publication Data
US 2022/0222096 A1   Jul. 14, 2022

(51) Int. Cl.
| | |
|---|---|
| *G06F 9/455* | (2018.01) |
| *G06F 9/48* | (2006.01) |
| *G06F 9/50* | (2006.01) |
| *G06F 8/61* | (2018.01) |
| *H04L 9/32* | (2006.01) |
| *G06F 9/30* | (2018.01) |

(52) U.S. Cl.
CPC ............ *G06F 9/45558* (2013.01); *G06F 8/63* (2013.01); *G06F 9/30079* (2013.01); *G06F 9/4881* (2013.01); *G06F 9/5077* (2013.01); *H04L 9/3268* (2013.01); *G06F 2009/45587* (2013.01); *G06F 2009/45595* (2013.01)

(58) Field of Classification Search
CPC .... G06F 9/45558; G06F 8/63; G06F 9/30079; G06F 9/5077; H04L 9/3268
See application file for complete search history.

(56) References Cited

U.S. PATENT DOCUMENTS

| | | | | |
|---|---|---|---|---|
| 2018/0287883 | A1* | 10/2018 | Joshi | G06F 9/455 |
| 2019/0347406 | A1* | 11/2019 | Lev-Ran | G06F 21/51 |
| 2020/0287724 | A1* | 9/2020 | Vaddi | H04L 9/3268 |
| 2022/0164214 | A1* | 5/2022 | Yu | G06F 8/65 |

\* cited by examiner

*Primary Examiner* — Dong U Kim
(74) *Attorney, Agent, or Firm* — Dinsmore & Shohl LLP

(57) ABSTRACT

Methods, systems, and apparatus, including computer programs encoded on computer storage media for using certificate injection tasks to generate containers having corresponding digital certificates. One of the methods includes receiving, by the distributed computing system, a source container image. A certificate injection task is executed, including: launching a container instance from the source container image and executing injection code within an execution environment of the launched container instance that writes one or more digital certificates to one or more corresponding locations within a file system of the execution environment. An output container image having the one or more digital certificates is then generated.

16 Claims, 3 Drawing Sheets

CONTAINER CERTIFICATE INJECTION

BACKGROUND

This specification generally relates to managing containers in cloud computing systems.

A container is a software module that, when executed, implements an isolated user space having operating-system-level virtualization. Containers running on a same underlying computing system, e.g., a virtual machine or physical computer, can thus share computing resources, e.g., memory or processing power, of the underlying computing system. The allocation of these computing resources to containers that are executing can be changed dynamically by a layer of software providing the operating-system-level virtualization. Containers can be launched from container images, which are software packages or other collections of files that include all the information needed to launch containers on an underlying computing system.

One area of complexity in the deployment process for containers relates to certificate management. A digital certificate is a collection of data, e.g., an electronic document or record, that is used to verify the owner of a cryptographic key, e.g., a public key. In doing so, a digital certificate can allow an application program to verify that it is communicating with trusted entities in a networked system. Often the application program and the other entities are controlled by the same entity that issues the certificates. For example, a container image can have an installed software program that is configured to communicate over a network with a backend database running in another container or on a physical server. But to do so, the software program first needs a certificate to verify ownership of a public key for communicating with the database.

One way to manage certificates is to embed them in the original source container image. But there are several drawbacks and limitations with this approach. First, doing so could pose a security risk depending on the storage security of the source image. Second, certificates typically expire after a period of time. This would therefore require also periodically updating the original source container with new certificates, which adds complexity and redundancy to the process. Moreover, in many situations developers do not even have the ability to modify the source container image because of enterprise security policies and vetting processes.

Another way to manage deployed certificates is to configure worker nodes to insert certificates at the appropriate places in the container file system for every task in a job. However, building this functionality into the underlying system itself would require encoding knowledge of all possible operating system distributions, how they use certificates, and where the certificates need to be stored. In addition, the insertion of certificates by every worker introduces redundancy and opportunities for errors.

SUMMARY

This specification describes a process for using a certificates injection task to inject digital certificates into a container image in a way that allows the certificates to be used when the container is launched.

Particular embodiments of the subject matter described in this specification can be implemented to realize one or more of the following advantages. Using a certificates injection task provides for more reliable and less error prone deployments of container images. In addition, using a certificate injection task is faster and more secure than other methods that might require container builder software to generate a container within a container, an operation that requires executing privileged containers that carry much greater security concerns. The techniques described below also eliminate duplication by removing the need to store multiple versions of source container images or the need to periodically refresh the source container images as the digital certificates expire.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
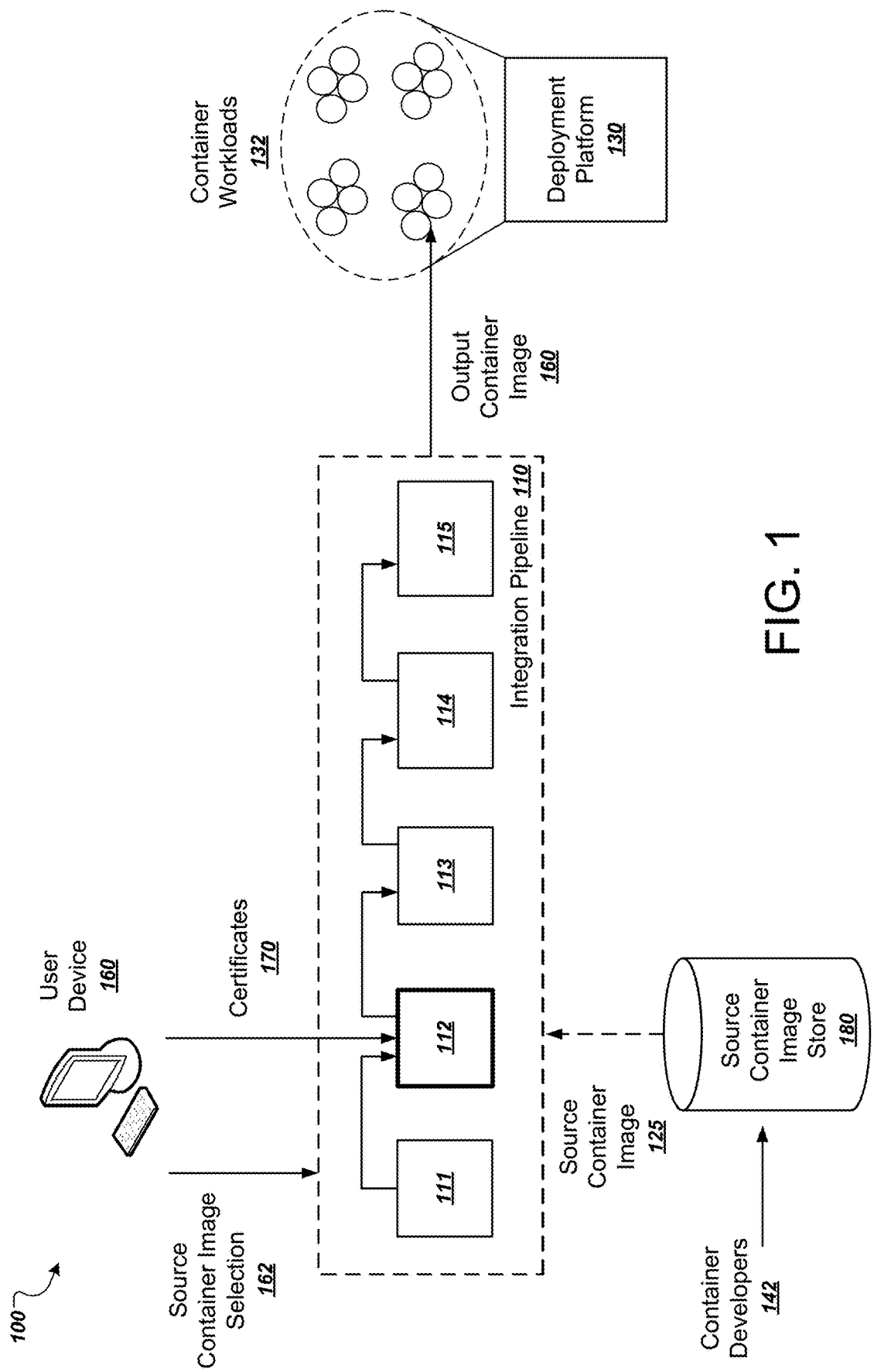
FIG. 1 illustrates an example system having a container integration pipeline.

FIG. 1 illustrates an example system 100 having a container integration pipeline 100. The container integration pipeline 100 can be used to perform a job having a sequence of tasks 111, 112, 113, 114, and 115, in order to configure a source container 125 to be deployed on a deployment platform 130.

The container integration pipeline 100 is an example of a system that can utilize certificate injection using the techniques described in this specification. In this specification, a container integration pipeline, or for brevity, a pipeline, is a software system that allows developers to customize the deployment of containers into a cloud computing platform, e.g., a container orchestration platform. An initial input to the pipeline is an original source container image, and the pipeline runs jobs that each include one or more tasks for configuring or modifying the container image for deployment. A common use case for container integration pipelines is for implementing a continuous integration system in which changes in software can be continuously integrated into a production environment. For example, the pipeline system can continually monitor a software repository for updates, and, when an update is detected, the pipeline system can run a job that relates to configuring and deploying the updated software in a production system.

The deployment platform 130 can be any appropriate system for executing one or more instances of a container, which can be executed on physical machines or on top of virtual machines executing on physical machines.

The deployment platform 130 can thus be implemented as a software system running on an underlying cloud computing infrastructure that provides functionality for launching instances of container workloads.

The integration pipeline 110 can also be implemented by any appropriate system of one or more computers. In some implementations, the integration pipeline itself is executed as workloads 132 on the deployment platform 130. For example, the integration pipeline 110 can be implemented by container workloads on the deployment platform 130 that monitor source code repositories for changes and kick off a job having tasks 111-115 when changes to the source code repositories are introduced.

Each task 111-115 is a software module that defines a transformation to be applied to a container image of an upstream task, or, in the case of the first task 111 in the pipeline, to a source container image stored in a source container image store 180.

Executing the tasks of the integration pipeline 110 to modify the container images can involve launching a container instance from the container image, e.g., on the deployment platform, making changes to the execution environment of the container as it executes, and then exporting that modified version of the execution environment as output. Thus, in some implementations, each task 111-115 can take as input a container image and, optionally, one or more other inputs, and output a modified container image for downstream tasks in the pipeline.

One of the tasks in the pipeline 110 is a certificate injection task 112. In this specification, a certificate injection task is a task in an integration pipeline that modifies an execution environment of an input container to have one or more certificates. The certificate injection task can then export the modified execution environment as an output container image.

For example, the certificate injection task 112 can take as input a source container image 125 either from an upstream task 111 or from a source container image store 180. For example, container developers 142, who can be entities that are external to the integration pipeline and the deployment platform can develop container images for a particular application to be executed on the deployment platform 130. The containers can then be stored in the source container image store 180. As mentioned briefly above, the storage of container images in the source container image store can involve rigorous security and vetting processes. And therefore, for developers wanting to launch workloads using the source container image, the source container image itself in the source container image store 180 is read-only. Moreover, the developers wanting to launch workloads using the source container image may not have any input into which source container images are available in the source container image store 180.

As a result, the containers in the source container image store 180 typically do not have the digital certificates required to verify the identities of entities on the deployment platform that require such certificates for communication.

A developer of a user device 160 can use a certificate injection task 112 to load certificates into the source container image. To do so, the developer can provide, through the user device 160 or another pathway, one or more certificates 170. As part of this process, the developer might also provide a source container image selection 162 that identifies which source container image in the source container image store to use for the tasks of the integration pipeline 110.

The certificate injection task 112 can receive the source container image 125, or a modified version thereof, and inject certificates. To do so, the certificate injection task 112 can use the input image to launch a container instance having an execution environment. The certificate injection task 112 can then execute injection code within the execution environment that copies the certificates 170 into the appropriate location in the execution environment. Because the configuration of the tasks of the integration pipeline is controlled by the developers of the user device 160, the certificate injection task 112 can be configured with all the information required to copy the certificates 170 into their appropriate locations on the file system. This means that such information does not need to be encoded or maintained by the integration pipeline system itself. Therefore, the certificates will end up in the correct places regardless of what operating system version the source container image contains.

After modifying the execution environment, the certificate injection task 112 can export an output container image that captures all the modifications to the execution environment. This arrangement has the advantage that all downstream tasks will now be able to use the injected certificates to communicate with entities in the deployment platform 130, which might be a requirement for them to operate correctly. An example of using a certificate injection task to properly set up a secrets configuration task is described in more detail in FIG. 2. Thus, in some implementations, the certificate injection task 112 is placed as early as possible in the integration pipeline 110. In the example of FIG. 1, the certificate injection task 112 is placed immediately after the get container task 111 that is responsible for obtaining the source container image in the first instance.

The final output of the integration pipeline 110 is an output container image 160 that can be used to launch workloads on the deployment platform 130.

Figure 2:
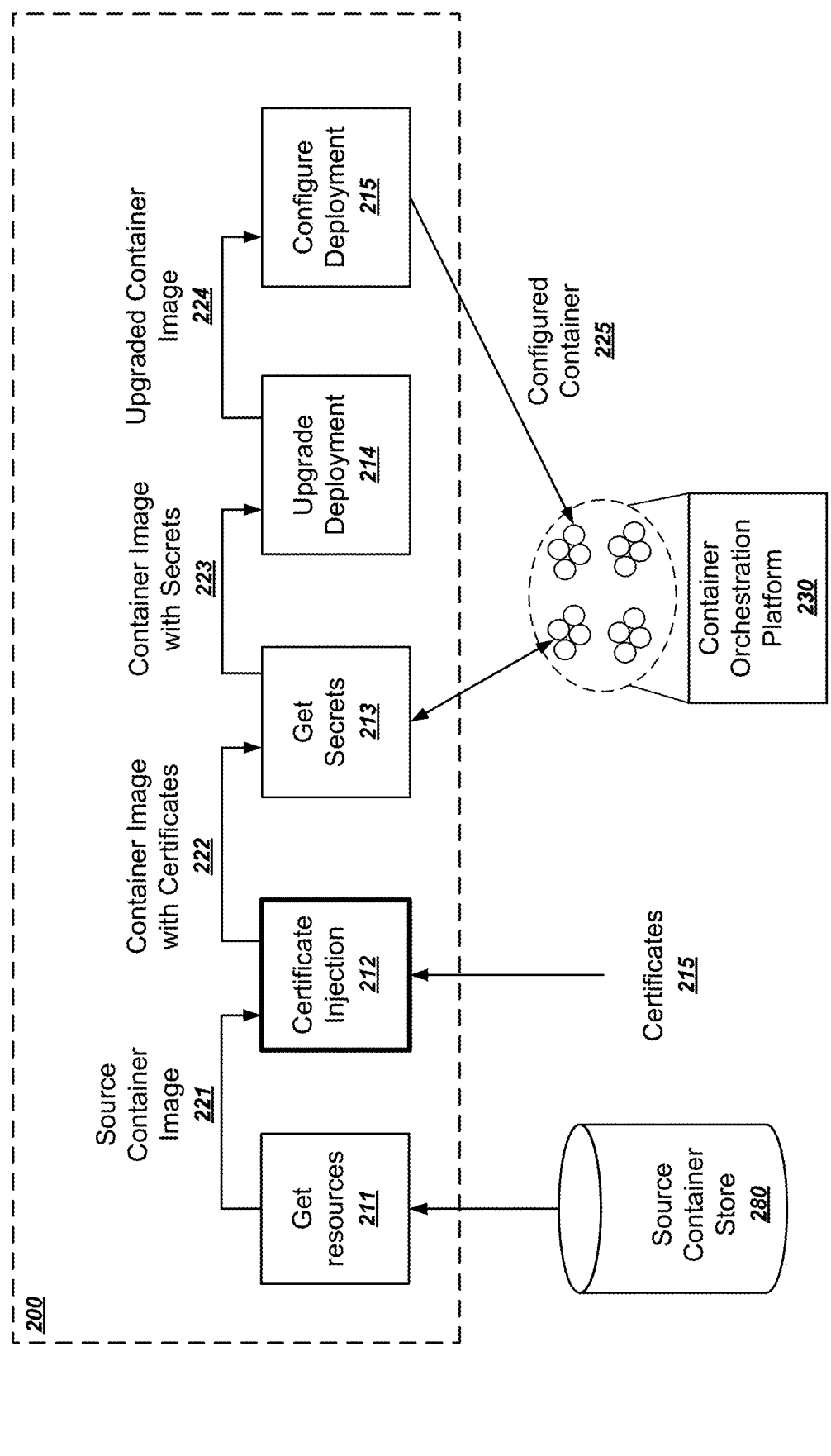
FIG. 2 is a diagram of an example integration pipeline that uses a certificate injection task.

FIG. 2 is a diagram of an example integration pipeline 200 that uses a certificate injection task. For example, the integration pipeline 200 can be implemented by the pipeline integration system 110 of FIG. 1. As part of this process, the integration pipeline 200 can communicate with a container orchestration platform 230, which is configured to launch container workloads. As one example, the container orchestration platform 230 can be a Kubernetes cluster. As mentioned above, in some implementations, the integration pipeline system 200 itself can be implemented by workloads executing in the container orchestration platform 230.

In this example, the job being implemented by the integration pipeline 200 has 5 tasks: a get resources task 211, a certification injection task 212, a get secrets task 213, an upgrade deployment task 214, and a configure deployment task 215.

The get resources task 211 is configured to obtain a source container image from a source container image store 280. The output of the get resources task 211 is thus a source container 221, which is passed to the certificate injection task 212.

The certificate injection task 212 is configured to launch a container having a running execution environment from the source container image 221. The certificate injection task 212 is also configured to receive certificates 215, e.g., from a developer or from a secure location.

The certificate injection task 212 then causes certificate injection code to run within the execution environment of the launched container, which writes the certificates 215 to the appropriate places in the file system of the execution environment launched from the source container image 221. As mentioned briefly above, the integration pipeline itself need not keep track of how different operating system versions handle digital certificates, e.g., where they are stored or what format they are stored in. Rather, the certificate injection code itself can be tailored for the particular properties of the source container image.

Another advantage of this approach is that the certificates can be written to the appropriate places in the file system without running privileged containers. This makes the process more secure because the non-privileged containers have less ability to do damage, should they somehow be compromised.

After the execution environment has been modified, the certificate injection task 212 exports a container image with certificates 222 that encapsulates all the properties of the execution environment. This makes the injected certificates available to all downstream tasks in the integration pipeline, which means that the certificates don't need to be fetched by or handled by those tasks.

As one example of why this is beneficial, consider the next task in the integration pipeline, the get secrets task 213. The get secrets task 213 is configured to modify the application code of the container image so that the application code can access resources in the container orchestration platform 230.

In order to get the secrets, however, the get secrets task 213 needs to communicate with a secrets database, which can, for example, be executing as a workload on the container orchestration platform 230. And doing this may itself require having a certificate in order to verify the secrets database. Because the certificate injection task 212 placed all certificates in the appropriate places, the get secrets task 213 can obtain the necessary secrets that it needs.

The get secrets task 213 outputs a container image with secrets 223 to an upgrade deployment task 214. The upgrade deployment task 214 is configured to fetch the changes to the application source code and apply those changes in the container image with secrets 223. For example, those changes might be what triggered the tasks to run initially.

The upgrade deployment task 214 outputs an upgraded container image 224 to a configure deployment task 215. The configure deployment task 215 is configured to modify the in-progress container image with a configuration that is tailored to the particular properties of the container orchestration platform 230. The integration pipeline system 200 can then launch one or more container instances using the configured container 225 on the container orchestration platform 230.

Figure 3:
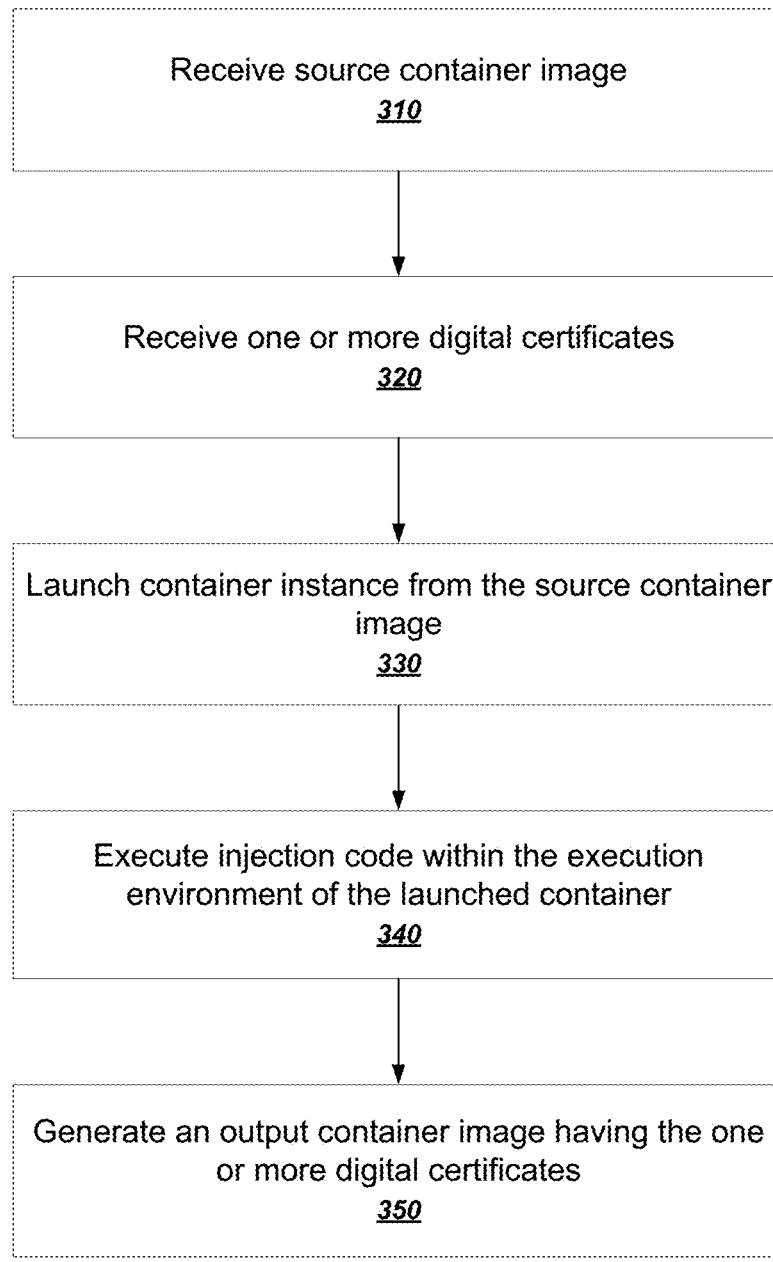
FIG. 3 is a flowchart of an example process for inserting certificates into a container using an integration pipeline.

FIG. 3 is a flowchart of an example process for inserting certificates into a container using an integration pipeline. For convenience, the process will be described as being performed by components of a distributed system having a plurality of computers in an underlying cloud computing system and programmed appropriately in accordance with this specification. For example, components of the system 100 of FIG. 1, appropriately programmed, can perform the example process. For clarity, the process will be described in the context of a developer using an integration pipeline to modify a source container image.

The system receives a source container image (310). The source container image can be stored in a source container image store or downloaded from a network location. As part of this process, the system can provide a user interface presentation to a developer, and the developer can provide input specifying a particular source container image to be processed through the integration pipeline.

The source container image can be generated by a number of different entities. For example, third-party container image developers can provide the system with container images for use by developers of the system. In some implementations, the container images are stored in a system that enforces security constraints that make the container images read-only for developers wanting to launch them on a deployment platform.

Alternatively or in addition, the container image can be downloaded from a network, e.g., the Internet, in response to a selection or other user input by the developer. As another example, the source container image can be generated or provided by the developer or an enterprise associated with the developer.

The system receives one or more digital certificates (320). The system can receive the digital certificates from a developer, who can provide the digital certificates as input to a certificate injection task. Alternatively or in addition, the integration pipeline can have a task that retrieves the digital certificates from a network location or from a secured storage device.

The system launches a container instance from the source container image (330). In other words, the system allocates computing resources to execute a container instance from the source container image, in which the container instance has an execution environment defined by the source container image, and optionally, one or more other inputs. In some implementations, the system launches the container instance on the same cloud-based deployment platform that is the target of the final output of the container integration pipeline.

The system executes injection code within the execution environment of the launched container (340). As described above, the injection code writes the one or more digital certificates to the appropriate locations on the file system of the execution environment of the launched container. The injection code can be tailored by the developer maintaining the integration pipeline so that the certificates are stored in their appropriate locations. Notably, the injection code can be executed in containers that do not have elevated privileges or in containers that do not have container builder software installed.

The system generates an output container image having the one or more digital certificates (350). As described above, the certificates in the output container image can be used by downstream tasks in a container integration pipeline, and therefore, those tasks need not be configured with operations to retrieve such certificates. The output container image may or may not be processed by one or more other tasks in the integration pipeline before being used to launch one or more container instances in the deployment platform.

In addition, the techniques described in this specification can be used to generate container images for executing arbitrary commands using digital certifications. In other words, a container image generated by a certificate injection task can be used for other purposes that do not relate to preparation in a container integration pipeline.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
receiving, by a distributed computing system comprising a plurality of computers, a source container image;
receiving, by the distributed computing system, one or more digital certificates;
executing, by the distributed computing system, a certificate injection task, including:
launching a container instance from the source container image,
executing injection code within an execution environment of the launched container instance that writes the one or more digital certificates to one or more corresponding locations within a file system of the execution environment, and
generating an output container image having the one or more digital certificates.

Embodiment 2 is the method of embodiment 1, wherein the distributed computing system comprises a container integration pipeline configured to execute a plurality of tasks in a predefined sequence.

Embodiment 3 is the method of embodiment 2, further comprising executing a subsequent task in the execution pipeline that requires the one or more digital certificates.

Embodiment 4 is the method of embodiment 3, wherein the subsequent task in the execution pipeline is a get-secrets task that uses the one or more digital certificates to obtain secrets from a secrets database.

Embodiment 5 is the method of embodiment 2, wherein the certificate injection task is located at a position in the sequence before all other tasks that modify the source container image in the predefined sequence.

Embodiment 6 is the method of any one of embodiments 2-5, further comprising deploying, on a deployment platform, a final version of the source container image having the digital certificates after all tasks of the container integration pipeline have been executed.

Embodiment 7 is the method of any one of embodiments 2-6, wherein only the certificate injection task is configured to write certificates to the source container image.

Embodiment 8 is the method of any one of embodiments 2-7, wherein launching the container instance from the source container image comprises launching a non-privileged container instance.

Embodiment 9 is the method of embodiment 8, wherein the non-privileged container instance does not have container builder software installed.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A distributed computing system comprising a plurality of computers storing instructions that are operable, when executed by the plurality of computers, to cause the plurality of computers to perform operations comprising:
   receiving, by the distributed computing system, a source container image;
   receiving, by the distributed computing system, one or more digital certificates; and
   executing, by the distributed computing system, a certificate injection task, including:
      launching a container instance from the source container image,
      executing injection code within an execution environment of the launched container instance that writes the one or more digital certificates to one or more corresponding locations within a file system of the execution environment, wherein the execution environment is a non-privileged environment without a container builder software, and
      generating, from the launched container instance, an output container image having the one or more digital certificates.

2. The system of claim 1, wherein the distributed computing system comprises a container integration pipeline configured to execute a plurality of tasks in a predefined sequence, wherein the plurality of tasks include the certificate injection task.

3. The system of claim 2, wherein the operations further comprise executing another task of the plurality of tasks after executing the certificate injection task, the other task requiring the one or more digital certificates, the executing the other task comprising,
   generating, from the output container image, using the one or more digital certificates, a second output container image.

4. The system of claim 3, wherein the other task is a get-secrets task, wherein using the one or more digital certificates comprises using the one or more digital certificated to obtain secrets from a secrets database, and wherein the second output container image includes the secrets.

5. The system of claim 2, wherein the certificate injection task is located at a position in the predefined sequence before all other tasks of the plurality of tasks that modify the source container image in the predefined sequence.

6. The system of claim 2, wherein the operations further comprise deploying, on a deployment platform, a final version of a container image generated based on executing the plurality of tasks.

7. The system of claim 2, wherein, of the plurality of tasks, only the certificate injection task is configured to write certificates to container image.

8. A method performed by a distributed computing system comprising a plurality of computers, the method comprising:
   receiving, by the distributed computing system, a source container image;
   receiving, by the distributed computing system, one or more digital certificates; and executing, by the distributed computing system, a certificate injection task, including:
  launching a container instance from the source container image,
  executing injection code within an execution environment of the launched container instance that writes the one or more digital certificates to one or more corresponding locations within a file system of the execution environment, wherein the execution environment is a non-privileged environment without a container builder software, and
  generating, from the launched container instance, an output container image having the one or more digital certificates.

9. The method of claim 8, wherein the distributed computing system comprises a container integration pipeline configured to execute a plurality of tasks in a predefined sequence, wherein the plurality of tasks include the certificate injection task.

10. The method of claim 9, further comprising executing another task of the plurality of tasks after executing the certificate injection task, the other task requiring the one or more digital certificates, the executing the other task comprising:
  generating, from the output container image, using the one or more digital certificates, a second output container image.

11. The method of claim 10, wherein the other task is a get-secrets task, wherein using the one or more digital certificated comprises using the one or more digital certificates to obtain secrets from a secrets database, and wherein the second output container image includes the secrets.

12. The method of claim 9, wherein the certificate injection task is located at a position in the predefined sequence before all other tasks of the plurality of tasks that modify the source container image in the predefined sequence.

13. The method of claim 9, further comprising deploying, on a deployment platform, a final version of a container image generated based on executing the plurality of tasks.

14. The method of claim 9, wherein, of the plurality of tasks, only the certificate injection task is configured to write certificates to a container image.

15. One or more non-transitory computer storage media encoded with computer program instructions that when executed by a distributed computing system comprising a plurality of computers cause the distributed computing system to perform operations comprising:
  receiving, by the distributed computing system, a source container image;
  receiving, by the distributed computing system, one or more digital certificates; and
  executing, by the distributed computing system, a certificate injection task, including:
    launching a container instance from the source container image,
    executing injection code within an execution environment of the launched container instance that writes the one or more digital certificates to one or more corresponding locations within a file system of the execution environment, wherein the execution environment is a non-privileged environment without a container builder software, and
    generating, from the launched container instance, an output container image having the one or more digital certificates.

16. The one or more non-transitory computer storage media of claim 15, wherein the distributed computing system comprises a container integration pipeline configured to execute a plurality of tasks in a predefined sequence, wherein the plurality of tasks include the certificate injection task.

* * * * *